US006941189B2

(12) United States Patent
Linn et al.

(10) Patent No.: US 6,941,189 B2
(45) Date of Patent: Sep. 6, 2005

(54) PROGRAMMABLE ADAPTABLE ASSEMBLY SYSTEM

(75) Inventors: Douglas Martin Linn, Union Lake, MI (US); Gerald Charles Rieck, Sterling Heights, MI (US); Charles Weldon Wampler, II, Birmingham, MI (US); Kevin U. Carriere, Milford, MI (US)

(73) Assignee: General Motors Corporation, Detroit, MI (US)

( * ) Notice: Subject to any disclaimer, the term of this patent is extended or adjusted under 35 U.S.C. 154(b) by 631 days.

(21) Appl. No.: 09/738,399

(22) Filed: Dec. 15, 2000

(65) Prior Publication Data

US 2002/0077721 A1 Jun. 20, 2002

(51) Int. Cl.[7] .............................................. G06F 19/00
(52) U.S. Cl. ...................... 700/193; 700/95; 700/114; 700/254; 702/85; 702/95
(58) Field of Search ........................... 700/193, 95, 114, 700/245, 254; 29/712, 771, 791; 702/85, 95

(56) References Cited

U.S. PATENT DOCUMENTS

| | | | | |
|---|---|---|---|---|
| 4,332,012 A | * | 5/1982 | Sekine et al. | 700/116 |
| 4,628,441 A | * | 12/1986 | Johnstone et al. | 700/193 |
| 5,272,805 A | * | 12/1993 | Akeel et al. | 29/712 |
| 5,374,884 A | * | 12/1994 | Koren et al. | 700/193 |
| 5,408,591 A | * | 4/1995 | Shih et al. | 358/1.5 |
| 5,461,570 A | * | 10/1995 | Wang et al. | 700/110 |
| 5,821,713 A | * | 10/1998 | Holling et al. | 318/439 |
| 6,134,507 A | * | 10/2000 | Markey et al. | 702/95 |
| 6,192,725 B1 | * | 2/2001 | Watson et al. | 70/208 |

* cited by examiner

Primary Examiner—Albert W. Paladini
Assistant Examiner—Charles Kasenge
(74) Attorney, Agent, or Firm—Christopher DeVries

(57) ABSTRACT

A positioner for use in a tooling apparatus, the positioner including a tool, at least one servo-motor for actuating said tool, a controller for controlling the servo-motor, nonvolatile memory in the controller, and a calibration stored in the nonvolatile memory, the calibration including compensation parameters for the build variance of the positioner.

29 Claims, 6 Drawing Sheets

PROGRAMMABLE ADAPTABLE ASSEMBLY SYSTEM

TECHNICAL FIELD

The present invention relates to manufacturing. More specifically, the present invention relates to a method and apparatus to provide for the adaptable assembly of products such as automotive vehicles.

BACKGROUND OF THE INVENTION

In today's vehicle market, there exist a variety of body shapes, sizes and styles to meet the demands of consumers. Traditionally, manufacturing facilities have been limited in the types of vehicle that they may manufacture because of different vehicle footprints and part number differences between vehicles. For example, compact cars and luxury cars have different body panel sizes and in some cases a different number of body panels. The tooling systems used in traditional manufacturing facilities have typically been mechanically and electrically fixed to produce one body configuration or style. To change to a different body configuration or style, these traditional tooling systems must be mechanically reconfigured and reprogrammed, creating delays and long startup times for vehicle body style changeovers. There is increasing pressure to reduce lead times and provide for increased flexibility in manufacturing facilities such that multiple vehicle body styles may be produced in generally the same period of time or quickly changed over.

Tooling systems typically include mechanical and electrical actuators coupled to tooling devices. The mechanical and electrical actuators may include electric motors, screws, gearboxes and/or slides. There will always be a slight build variance between electrical and mechanical actuators of the same type. For example, the run-out for electric motor shafts, the backlash in gear boxes, and the pitch in screws will slightly vary between actuators of the same type. These slight variances will be amplified by the assembly of multiple mechanical and electrical actuators into one robot or positioning tool such as a multi-axis positioner used in the assembly of vehicles. Accordingly, upon replacing a faulty positioning tool, the new positioning tool must be shimmed, rotated, adjusted and/or reprogrammed to exhibit the same dynamic and static characteristics of the previous faulty positioning tool. This is a time-consuming process that may cause delays in production for a manufacturing facility.

SUMMARY OF THE INVENTION

The present invention incorporates a programmable adaptive assembly system (PAAS) that enables the flexible manufacturing of multiple vehicle types or styles and compensates for build variances between robots or positioners used for the same production functions and a nominal or "ideal" positioner. The present invention permits quick replacement of failed positioners without losing accuracy through an electronic plug-and-play system, reducing manufacturing costs associated with downtime and insuring the quality of a vehicle assembly.

The PAAS system of the present invention further includes a tooling system assembly for a work cell that has been designed to allow the replacement of traditional vehicle body specific shop tooling, with a single common, programmable tool set that is capable of building multiple vehicle body styles. The tooling system of the present invention is a highly accurate, modularly scaleable, programmed positioning device used to hold tooling locators and other tooling devices used in the assembly of vehicles. The work cell of the present invention is also scaleable with the ability to be configured for any number of positioners.

The PAAS system of the present invention comprises a robot or positioner coupled to an end effector having a tooling device. The positioner includes a plurality of servo-motors and mechanical actuation devices such as gearboxes, linear slides, and screws to position the tooling device in three dimensions, as required by a manufacturing work cell. A servo-drive or servo-controller, in communication with a tooling coordinator system, controls the movement of the servo-motors and stores compensation parameters or a calibration that describe the kinematics of the positioner. The calibration is used by the tool coordinator to reference and compensate for the movements of the positioner against an absolute coordinate set or the "ideal" positioner for the manufacturing work cell. In this manner, upon the failure of a first positioner, a second positioner may easily be installed in its place in a plug-and-play manner. The servo-controller of the second positioner will automatically download the calibration for the second positioner to the tool coordinator and allow the tool coordinator to make the necessary actuation command adjustments to compensate for the build variances between the first and second positioners.

DESCRIPTION OF THE PREFERRED EMBODIMENT

Figure 1:
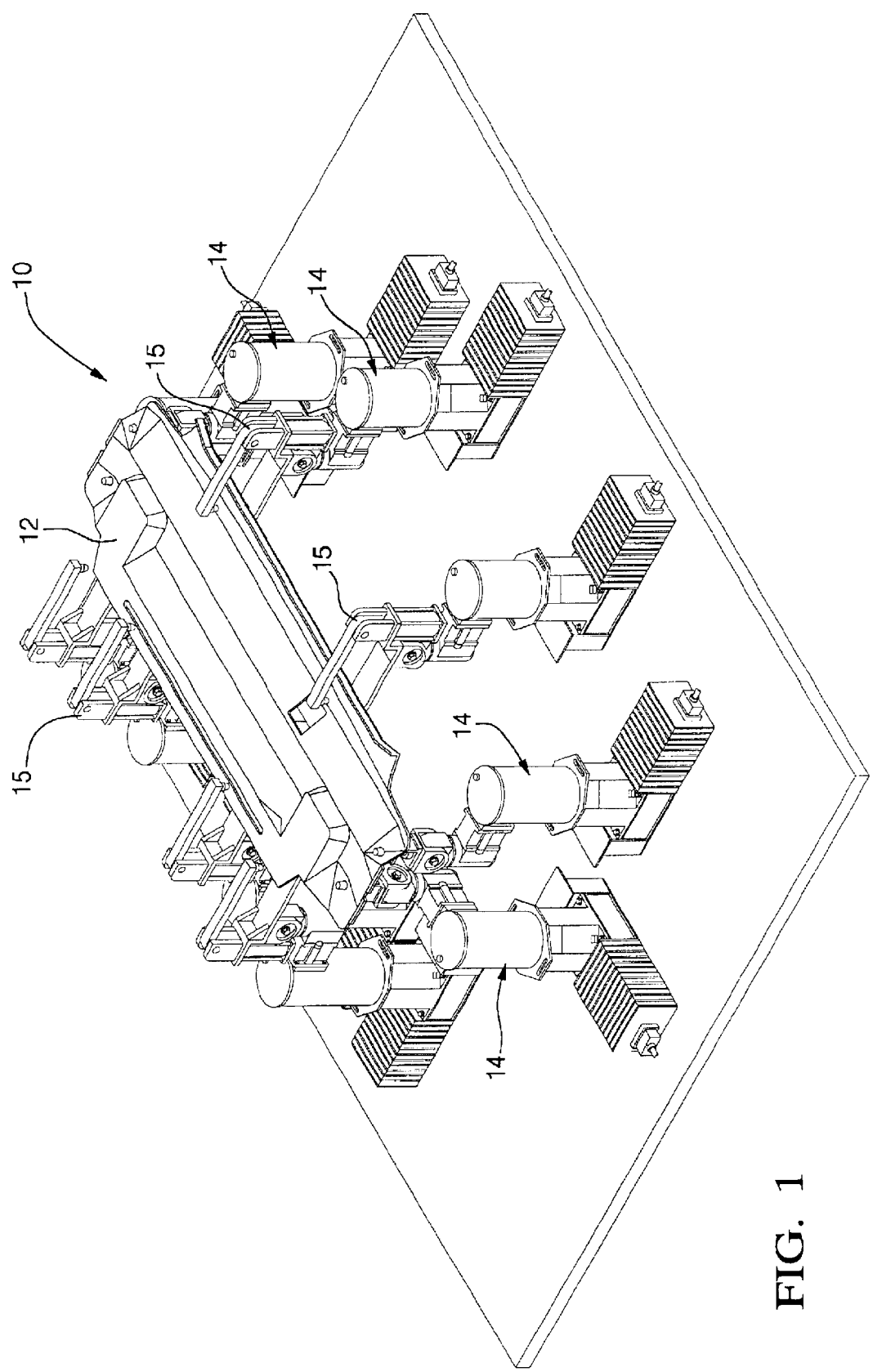
FIG. 1 is a diagrammatic drawing of a manufacturing cell of the present invention.

FIG. 1 is a diagrammatic view of a programmable adaptive assembly system (PAAS) for a work or manufacturing cell 10 used in the present invention. The manufacturing cell 10 is preferably incorporated in a manufacturing production line for the manufacture of vehicles 12. Tooling robots or positioners 14 are used in the assembly of the vehicles 12 and are designed to be worked with hard tools and can be operated with automation and/or manual interaction. End effectors 15 equipped with tool holders, clamps and/or pins may be manipulated by the tooling positioners 14 in any manner required for the assembly of the vehicles 12. The PAAS system is used to locate tooling at different required spatial positions or datums, for different styles of subassembly builds for vehicles 12. Accordingly, the positioners 14 of the PAAS system may be reconfigured quickly and easily for different vehicle styles being assembled. The positioners 14 of the PAAS system preferably include locating clamps coupled to the end effectors 15 for the fixturing of vehicle body panels. The positioner 14 architecture is optimized for application functionality, positional repeatability, accuracy, stiffness and payload capacity.

The basic functions of the positioners 14, as previously described, are to hold and manipulate tooling to assemble a vehicle. The number of positioners 14 used in the manufacturing work cell 10 is scaleable and is determined by the datum and locator strategy for the products or vehicle style to be built in that manufacturing work cell 10. The positioners 14 are used with principal locating points (PLPs) that move dimensionally from style to style, and a hard tool for locators that are common for each style or product being manufactured. The positioners 14 are designed to be extremely repeatable, accurate, able to withstand the harsh environment of an auto body shop, cost effective, and maintainable by manufacturing plant personal.

Figure 2:
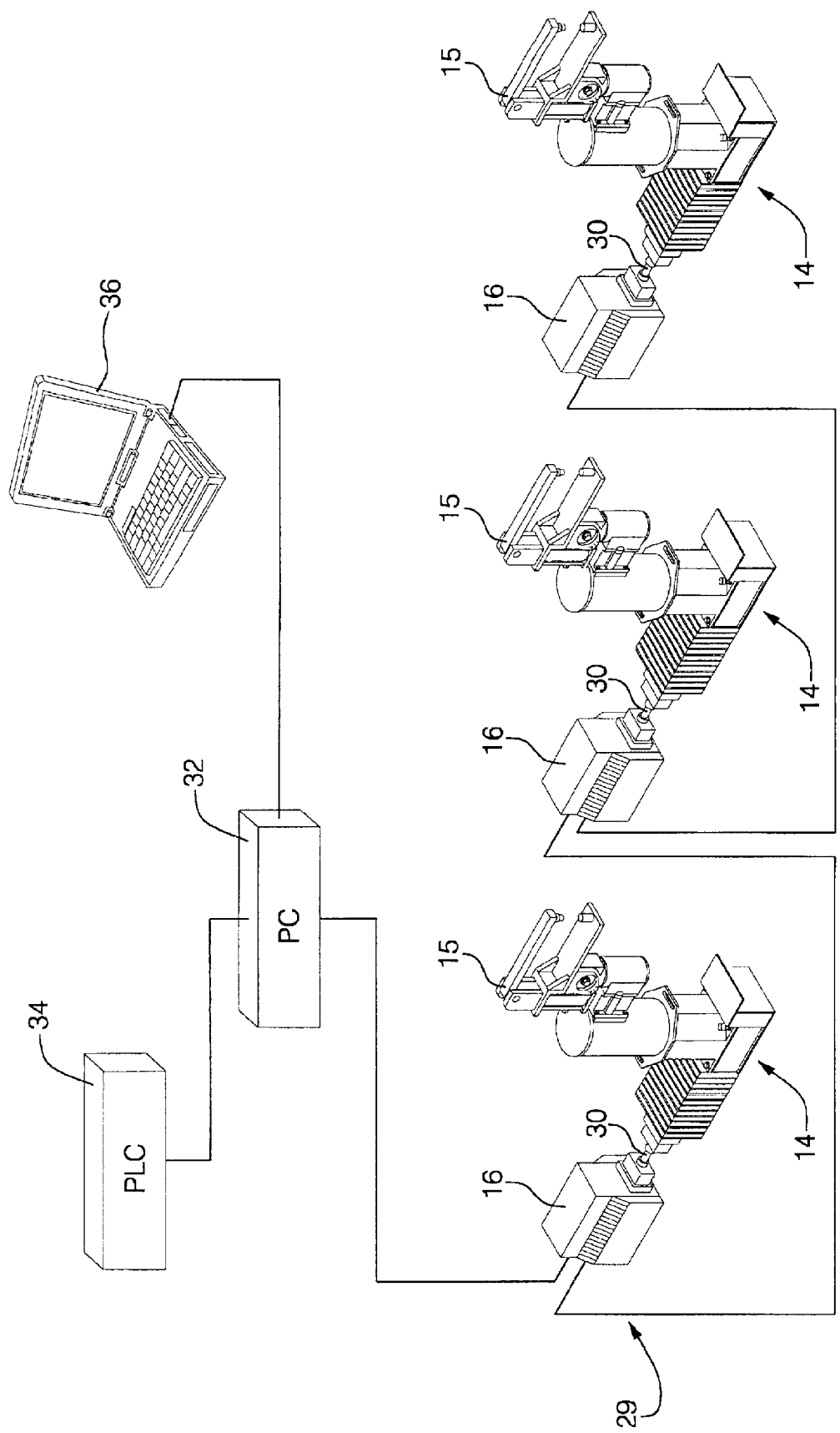
FIG. 2 is diagrammatic drawing of the tool coordinator control system for the manufacturing cell of the present invention.

FIG. 2 is a diagrammatic drawing of the control system for the PAAS system in the manufacturing cell 10 of the present invention. Each positioner 14 preferably includes five servomotors having absolute position feedback, but any number of servomotors is within the scope of the present invention. The type of servomotors that are used in the present invention include, but are not limited to, brushless DC motors, AC space-vector technology, DC motors, stepper motors, and reluctance motors. The absolute position feedback may be provided by any positioning device known in the art including, but not limited to, linear encoders and rotary encoders.

Figure 3:
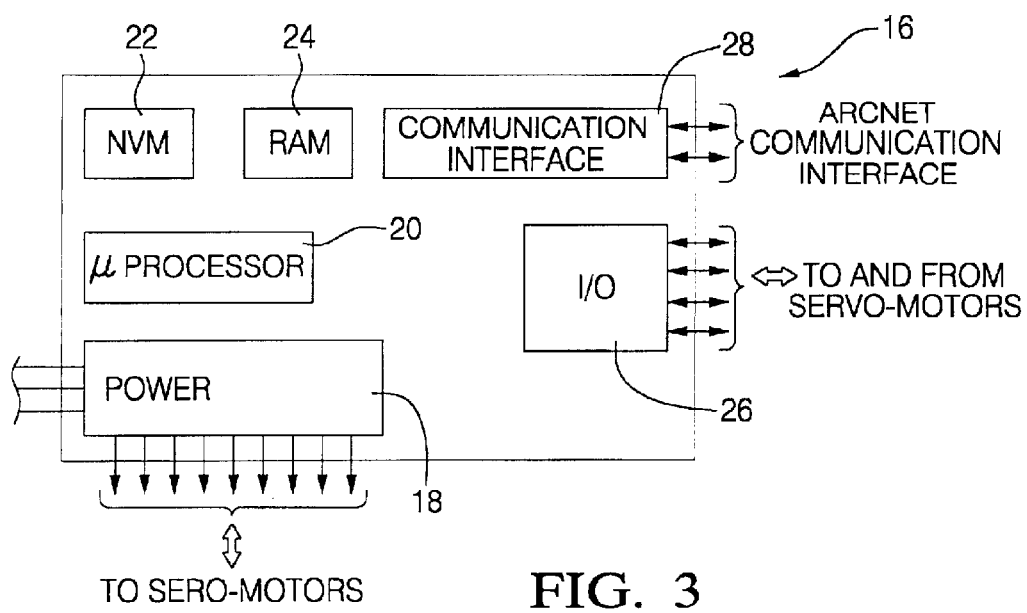
FIG. 3 is a diagrammatic drawing of a servo drive of the present invention.

As seen in FIG. 2, a servo-drive amplifier or servo-controller 16 is the electronic drive unit that provides power and servo control for each of the five servomotors in the positioner 14. The servo-drive controllers 16 are preferably environmentally sealed with radiant fins to transfer heat to external air. Referring to FIG. 3, the servo-drive controller 16 includes power circuitry 18 necessary to provide switched or conditioned electrical energy to the servomotors, a microprocessor/microcontroller 20, a positioning program and calibration stored in nonvolatile memory (NVM) 22, random access memory (RAM) 24 for the execution of programs, an input/output interface 26 to the servomotors of the positioner and other process control devices, and a network communication interface 28 for communicating on a computer network 29.

The servo controller 16 and the positioner 14 are electrically coupled together through cable 30. Cable 30 is preferably a shielded cable that carries power from the power circuitry 18 in the form of electrical energy to the servomotors and position and speed feedback signals in the form of low voltage signals from the servomotors to the input/output interface 26 of the servo controller 16.

The servo controllers 16, as previously described, are equipped with a network communication interface 28 such as an ARCNET interface to communicate over the computer network 29 and coordinate the movement of the positioners 14. While ARCNET is the preferred network and network interface of the servo-drives 16 of the present invention, any communication/ computer network such as Ethernet, DEVICENET or CAN may also be used in the present invention. The servo-drives 16 are further linked, via the computer network 29, to a central coordinator control system for the PAAS system residing on a computer collectively termed as the tool coordinator 32. The servo-drive controllers 16 and computer network 29 are preferably wired in daisy chain fashion, as shown in FIG. 2, for connection to the tool coordinator 32. Each servo controller 16 has a network or node address that is uniquely specified for each servo controller 16 in the manufacturing work cell 10.

The tool coordinator 32, as previously described, comprises tool coordination software residing on a computer. The tool coordinator 32 manages and processes actuation commands from an industrial controller 34, such as a programmable logic controller (PLC), or diagnostic monitor 36, and transfers the commands to the servo controllers 16, via the computer network 29. The tool coordinator 32 communicates with the industrial controller 34 over a DEVICENET network. While DEVICENET is the preferred communication network for connecting the tool coordinator 32 and industrial controller 34, any computer network may be used including, but not limited to, Ethernet, Data Highway+, DH 485, any type of serial network, Profibus DP, and/or Modbus+.

The tool coordinator 32 acts as the network master for the dedicated servo controller 16 ARCNET network. The tool coordinator 32 commands each of the servo controllers 16 to actuate the positioners 14 in the manufacturing work cell 10. The tool coordinator 32 in the preferred embodiment may communicate with up to 254 nodes or servo controllers 16. The tool coordinator 32 further analyzes and stores the calibration data for the positioners 14 upon transfer from the servo-drive controllers 16.

The diagnostic monitor 36 comprises a computer, preferably a laptop personal computer, which includes a diagnostic software and programming tools. The diagnostic monitor 36 communicates with the tool coordinator 32 via a serial link such as an RS232 or RS422 link. The diagnostic monitor 36 has multiple functions including programming, manual control of positioner 14 movement, diagnosis and correction of positioner 14 control problems, electronic shimming, data management, system backup and system restoration.

Figure 4:
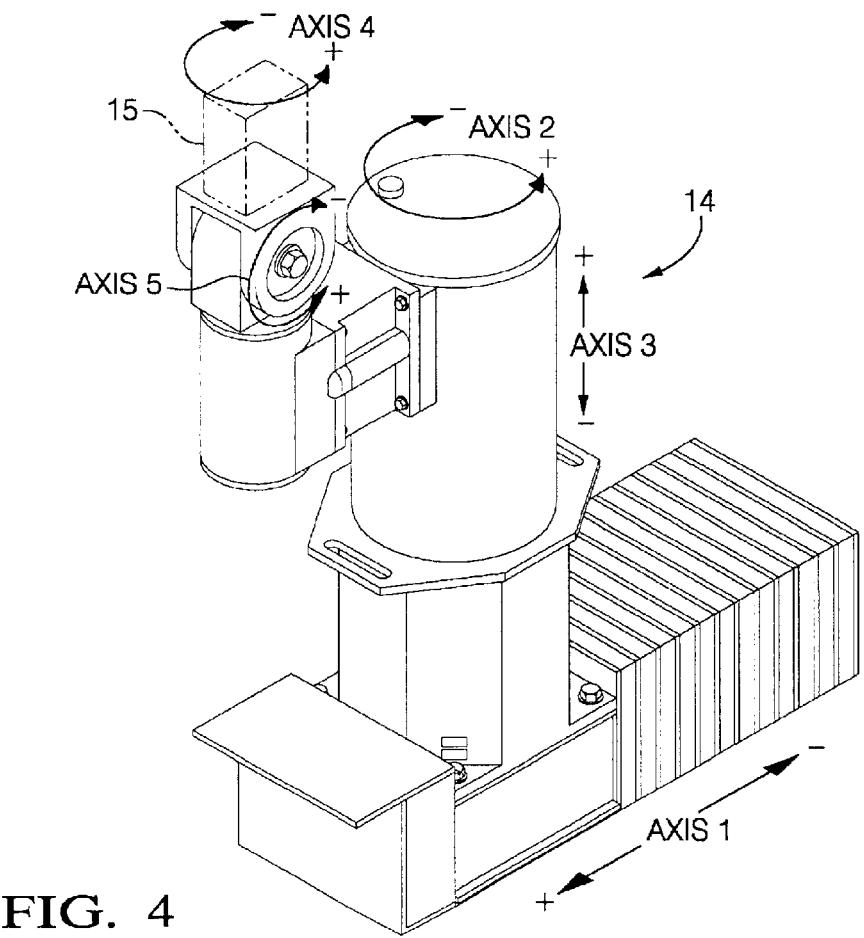
FIG. 4 is a diagrammatic perspective drawing of the actuation directions of the positioner of the present invention.

Referring to FIG. 4, to adapt to different vehicle assembly models and styles, the positioner 14 is preferably capable of five different types of articulation as shown by axes one-five. The positioner may move horizontally (axis one), vertically (axis three), and rotate around a vertical axis (axis two). The tooling attachment or end effector 15 may rotate around both vertical and horizontal axes (axes four and five). The actual performance dynamics will vary based on the design and dimensions of the positioner 14. By repositioning tools under the control of the positioner 14, the work cell 10 of the present invention is capable of building multiple models of vehicles 10, and can be easily reprogrammed when a new model is introduced into production.

Figure 5:
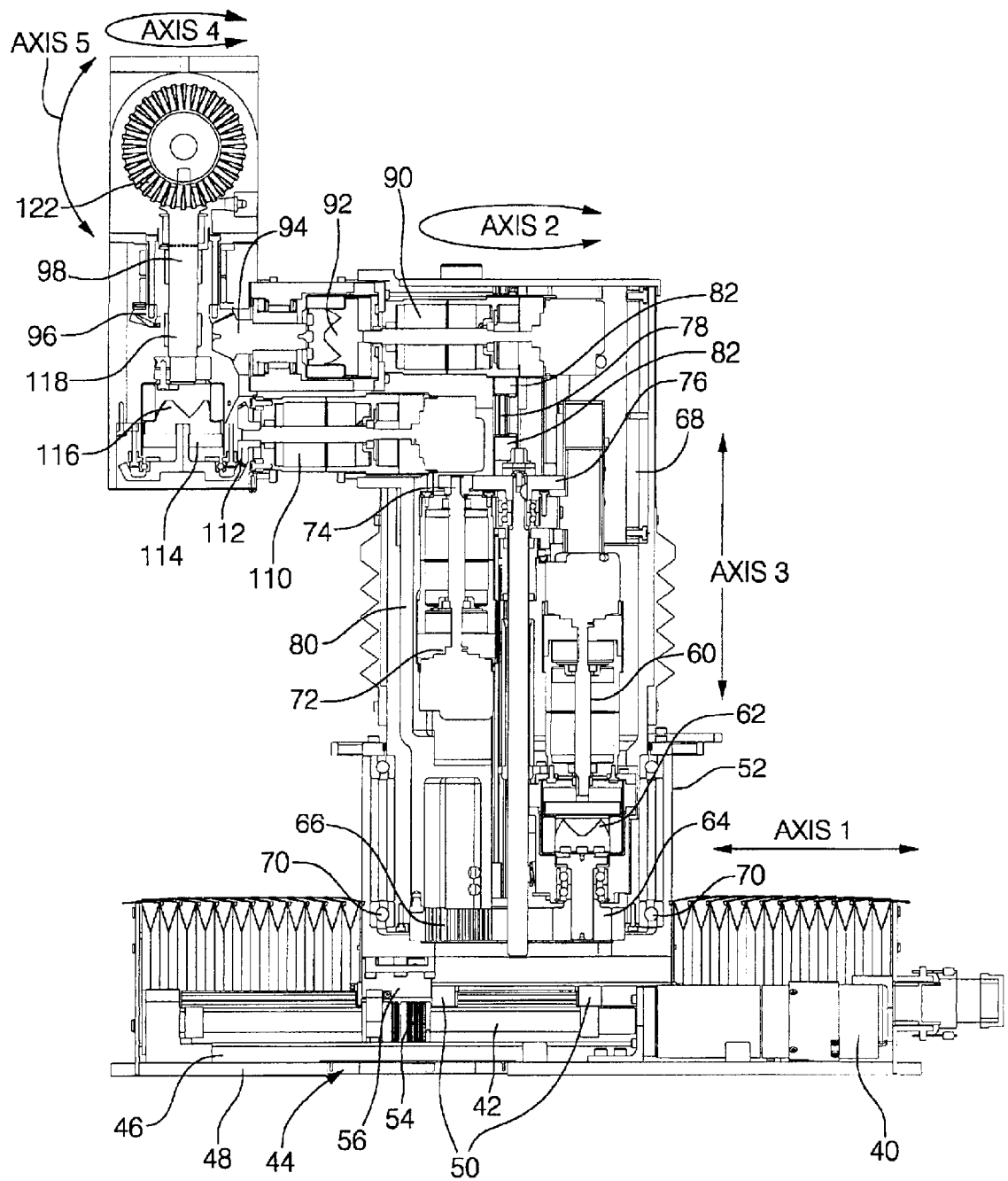
FIG. 5 is a cutaway drawing of a positioner of the present invention.

FIG. 5 further illustrates the construction and movement of the positioner 14 of the present invention. Axis one is a linear axis which provides travel in what will be defined as a horizontal direction with reference to the orientation of FIGS. 4 and 5. A first servo-motor 40 is coupled to a lead screw or ball screw 42 to provide the linear motion for a slide 44 coupled to linear rails 46 mounted to a baseplate 48. Linear bearing blocks 50 are mounted within a main casting 52 of the positioner 14 to provide movement along axis one for the main casting 52. An anti-backlash lead screw nut 54, finned for cooling, is connected to the main casting 52 by means of a bracket 56. The mounting diameter of the lead screw nut 54 is grooved to house a quad-ring (not shown). The purpose of the quad-ring is to provide a slight radial float of the lead screw nut 54 to compensate for any slight misalignment between the centerline of the leadscrew 42 and the centerline of the lead screw nut 54. When the first servo-motor 40 is actuated, the entire positioner 14 will move along axis one on the linear bearings 50 carrying the other four axes.

Axis two is a rotary axis with the axis of rotation perpendicular to axis one (in a normal mounting position perpendicular to the floor). Axis two is driven by a second servo-motor 60 which is similar to the first servo-motor 40 of axis one. The second servo-motor 60 is connected to a gearbox 62, and the output shaft of the gearbox 62 is fitted with a pinion gear 64. The pinion gear 64 is meshed with an internal gear 66. The internal gear 66 is rigidly mounted to the main casting 52 of the positioner 14. Also mounted to and within the main casting 52 is a vertical tube 68. The vertical tube 68 is supported by means of ball bearings 70. The second servomotor 60 and gearbox 62 combination is mounted to the internal wall of the vertical tube 68 through a clevis arrangement. When the second servo-motor 60 is actuated, the vertical tube 68 and everything mounted within it or to it is rotated about the centerline of axis two.

Axis three is a linear axis which allows the top portion of the positioner 14 unit to telescope vertically up and down along the axis two centerline. Axis three is driven by a third servo-motor 72 similar to servo-motors 40 and 60. The output shaft of the third servo-motor 72 is fitted with a pinion gear 74 meshed with gear 76 which is attached to a ball screw or lead screw 78. The third servo-motor 72 is bolted to a vertical axis casting 80 through a motor bracket. A bracket 82 contains bearings which support the leadscrew 78. The leadscrew includes an anti-backlash leadscrew nut similar to nut 54 which is rigidly mounted to the vertical tube 68. When the third servo-motor 72 is actuated, the leadscrew 78 is rotated and the vertical axis casting 80 is raised (or lowered depending on the direction of rotation), and carries with it everything mounted to it.

Axis four is a rotational axis found at the top extremity of the positioner 14. Axis four is driven by a fourth servo-motor 90 which is similar to the previous servo-motors 40, 60 and 72. The fourth servo-motor 90 is connected to a gearbox 92 which is mounted within a gearbox casting. Mounted to the output shaft of the gearbox 92 is a bevel pinion gear 94. The bevel pinion gear 94 meshes with a bevel gear 96 which is mounted to shaft 98. The entire wrist mechanism or end effector 15 is fastened to the shaft 98. When the fourth servo-motor 90 is actuated, the bevel pinion gear 94 drives bevel gear 96, in turn rotating shaft 98 and all the wrist mechanism or end effector 15 mounted to shaft 98 about axis four.

Axis five is another rotational axis found within the wrist mechanism or end effector 15 at the top of the positioner 14. Axis five is driven by a fifth servo-motor 110, which is similar to the previous servo-motors 40, 60, 72 and 90 described. A bevel pinion gear 112 is attached to the fifth servo-motor 110 shaft. The bevel pinion gear 112 is in mesh with another bevel gear 114, which is mounted to the input of a harmonic drive gearbox 116. Piloted into the output side of the harmonic drive gearbox 116 is the end of another bevel gear pinion 118. The bevel gear pinion 118 is rigidly coupled to the gearbox 116. When the fifth servo-motor 110 is actuated, power is transmitted through bevel gears 112 and 114, gearbox 116, pinion 118 and a bevel gear 120, causing a wrist clevis casting 122 to move in a pitching motion about the illustrated by axis five. The end effector 15 in the preferred embodiment is an independent module containing electronics and a calibration that may be freely swapped between positioners 14. The end effector is also calibrated against a nominal or "ideal" end effector.

As shown in FIG. 5, each positioner 14 incorporates a series of modular mechanical linkages and, as described earlier, each corresponding servo-controller 16 incorporates electrically-embedded calibration or a "personality" describing the static and dynamic dimensional characteristics of each linkage of each positioner 14. The calibration allows compensation for mechanical build variation from positioner 14 to positioner 14 or the nominal positioner to allow interchangeability of positioners 14, reducing the cost of maintaining spare positioners 14 in a manufacturing plant. The calibration of each positioner 14 allows the tool coordinator 32 to adapt to dimensional variation in individual components in the positioners 14 or the positional variations in the different works spaces.

The positioners 14 are calibrated at the manufacturer to generate the unique compensation parameters or calibration for the build variances of each positioner 14. This provides the plug-and-play capability for the positioners 14 of the PAAS system and assures accuracy from positioner 14 to positioner 14. To calibrate a positioner 14, a motorized laser tracker and laser detector measures the static and dynamic characteristics of the positioner 14. The positioner 14 is actuated throughout its entire range of motion and the resulting position information/calibration generated by kinematic parameters, such as the effective length of each link, is stored and transferred to the corresponding servo-drive controller 16. While a laser tracker has been described in the present invention, any type of position sensing technology such as digital optical cameras, charge coupled devices, radar, and ultrasonic positioner detectors are included within the scope of the present invention.

Figure 6:
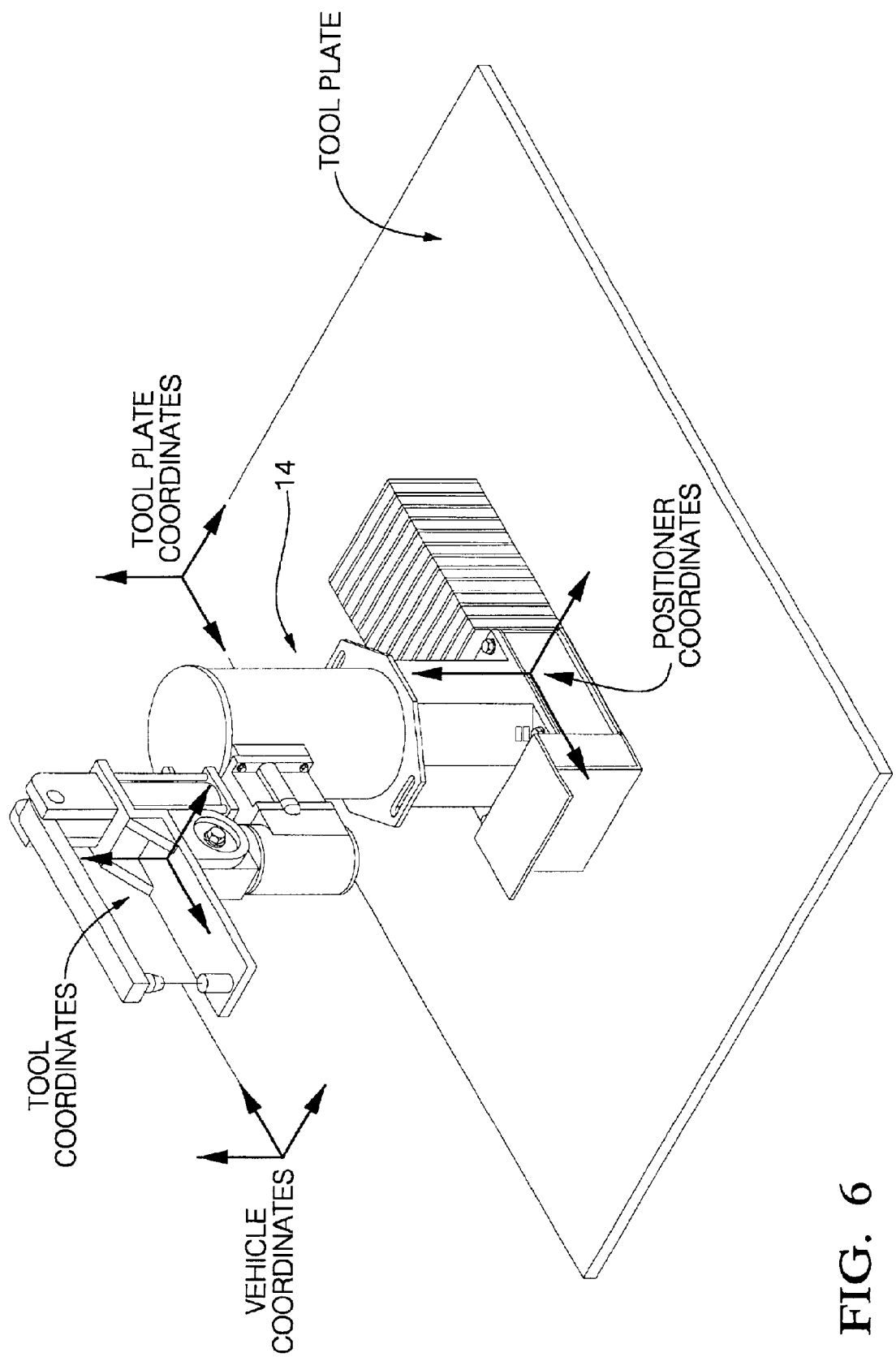
FIG. 6 is a diagrammatic drawing illustrating the coordinate systems used in the present invention.

Manufacturing work cell 10 accuracy also depends on an accurate assessment of the relative location of the positioners 14 and the positions of their movements as they relate to each other. By computer simulations using computer aided design (CAD) or other means, nominal command data is generated for the manufacturing work cell 10. The coordinates that must be factored into each move or command to a positioner 14 are shown in FIG. 6 and include vehicle coordinates, tool coordinates, positioner coordinates, and tool plate coordinates. The command data generated for positioner 14 movement includes numerical definitions of the nominal location of the base of each positioner 14 in a master coordinate system (the tool plate coordinates based on the nominal or "ideal" positioner); numerical definitions of the end effectors 15 and tool points with respect to mounting features on the positioner 14; and calibration parameters for each positioner 14 are determined as the final step in its manufacture, or after any repair work. The types of errors that may be compensated for include tool plate errors, where the bases of the positioners 14 are mounted in the workcell coordinate system, positioner 14 deviations from the nominal positioner 14, and tool deviations from a nominal or "ideal" tool.

Figure 7:
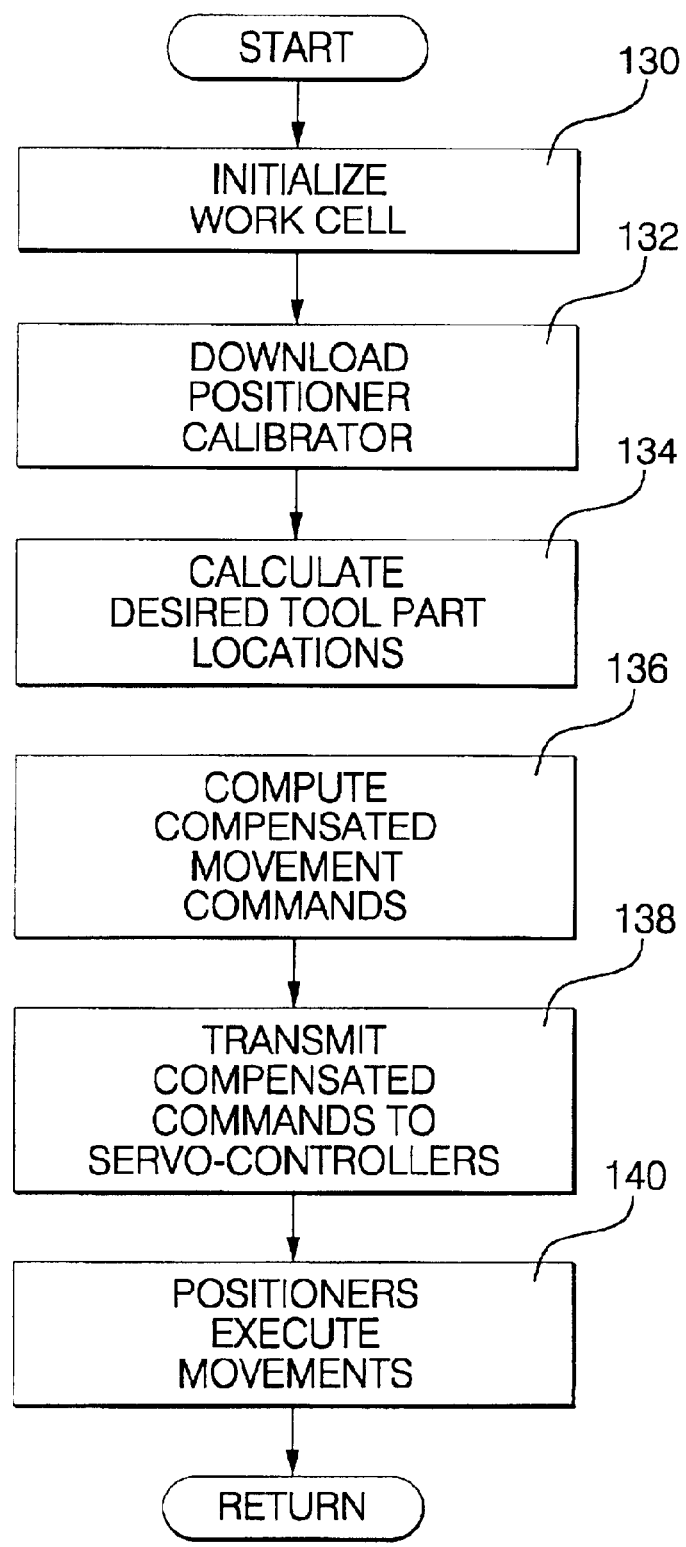
FIG. 7 is a flowchart illustrating a preferred method of the present invention.

Referring to the flow chart of FIG. 7, at Block 130, during the initialization or restart of the work cell 10, the tool coordinator 32 reads the nominal command data and the actual measurement data for the work cell 10 and the end-effectors from the tool coordinator 32 memory. At Block 132, the tool coordinator queries the NVM 22 of the servo controllers 16 of the positioners 14, via the computer network 29, to obtain their calibration parameters. The tool coordinator 32 also reads a file of electronic shimming commands which are incremental translations or rotations of the tools to be added to the originally-planned tool locations from tool coordinator 32 memory. The tool coordinator 32 at Block 134 uses the nominal data to calculate the desired toolpoint locations as originally planned in CAD, and then adds the shim adjustments to generate the end effector 15 locations as desired in the manufacturing cell 10. The tool coordinator 32 uses the actual measurements of the workcell 10 and the calibration parameters of the positioners 14 at Block 136 to compute compensated movement or joint commands to the servo controllers 16 that place the toolpoints in the desired locations. The compensated movement or joint commands are downloaded to the individual servo controllers 16 at Block 138 and the movements are executed by the positioners 14 at Block 140.

Maintenance/repair procedures are established such that after replacing a failed positioner 14, the tool coordinator 32 is re-initialized to read the calibration of a new positioner. Thus, accurate actuation commands are maintained during positioner 14 replacement. Accordingly, positioners 14 and their corresponding servo controllers 16 may be connected to the tool coordinator 32 in a plug-and-play fashion.

While this invention has been described in terms of some specific embodiments, it will be appreciated that other forms can readily be adapted by one skilled in the art. Accordingly, the scope of this invention is to be considered limited only by the following claims.

We claim:

1. A positioner for use in a tooling apparatus, said positioner comprising:
   a tool;
   at least one servo-motor for actuating said tool;
   a controller for controlling said servo-motor;
   nonvolatile memory in said controller;
   a calibration stored in said nonvolatile memory, said calibration including compensation parameters for build variance of said positioner; and
   wherein said calibration is a measure of the variance of said positioner from a nominal positioner.

2. The positioner of claim 1 wherein said tool includes a locating pin.

3. The positioner of claim 2 wherein said locating pin fixtures body parts for a vehicle.

4. The positioner of claim 1 wherein said servo-motor is a permanent magnet brushless motor.

5. The positioner of claim 1 wherein said servo-motor is a DC motor.

6. The positioner of claim 1 wherein said servo-motor is a stepper motor.

7. The positioner of claim 1 wherein said controller provides electrical excitation to said servo-motor.

8. The positioner of claim 1 wherein said controller includes a communication interface.

9. The positioner of claim 8 wherein said communication interface is an ARCNET interface.

10. The positioner of claim 1 wherein said absolute coordinate set is defined within a work cell.

11. The positioner of claim 1 wherein said calibration enables the positioner to be plugged into said work cell and compensated for differences from a previous positioner to ensure the correct movement of the positioner with reference to said work cell.

12. A work cell for use in the assembly of vehicles, said work cell comprising:
   a plurality of multi-axis positioners;
   a plurality of position controllers for controlling said plurality of multi-axis positioners;
   a network interface in each said position controller;
   nonvolatile memory in each said position controller;
   a calibration stored in each said position controller containing compensation parameters for each multi-axis positioner; and
   wherein said calibration is a measure of the variance of said positioners from a nominal positioner.

13. The work cell of claim 12 wherein each said multi-axis positioner includes a plurality of motors.

14. The work cell of claim 12 wherein said network interface is an ARCNET interface.

15. The work cell of claim 12 wherein at least one of said positioners includes a locating pin.

16. The work cell of claim 15 wherein said locating pin fixtures body parts for a vehicle.

17. The work cell of claim 12 wherein said calibration is a measure of the variance of said positioner from an absolute coordinate set.

18. The work cell of claim 17 wherein said absolute coordinate set describes the layout of the work cell.

19. The work cell of claim 12 further including a system controller in communication with said plurality of positioner controllers to coordinate said multi-axis positioners.

20. The work cell of claim 19 wherein each said positioner controller communicates each said calibration to said system controller to allow said system controller to generate actuation commands to said system controllers with compensation for variances from an absolute coordinate set defined in said calibration.

21. The work cell of claim 19 wherein said position controllers have the ability to plug and play within said work cell, said system controller accounting for the variances from an absolute coordinate set of each additional position controller.

22. An automated work cell for use in the assembly of vehicles, said work veil adaptable for the assembly of a plurality of vehicle types comprising:
   a plurality of multi-axis positioners;
   a plurality of position controllers for controlling said plurality of multi-axis positioners;
   a network interface in each said position controller;
   nonvolatile memory in each said position controller;
   a system controller in communication with each of said position controllers;
   wherein said system controller has the ability to generate position commands to said plurality of position controllers, said position commands varying with the type of vehicle to be assembled by the automated work cell; and
   wherein each said position controller contains a calibration, said calibration a measure of the variance of said positioners from a nominal positioner.

23. The automated work cell of claim 22 wherein each said position controller includes a calibration in said nonvolatile memory, wherein said calibration is a measure of the variance of said multi-axis positioner from an absolute coordinate set.

24. The automated work cell of claim 23 wherein said calibration enables a multi-axis positioner to be installed into said work cell, said system controller compensating for differences from a previous positioner to ensure the correct movement of the positioner with reference to said work cell.

25. The automated work cell of claim 22 wherein said system controller has the ability to be programmed with recipes for different vehicle assemblies.

26. The automated work cell of claim 24 wherein said recipes correspond to position commands.

27. A method of controlling a work cell for use in the assembly of a vehicle, said method comprising:
   providing a plurality of multi-axis positioners;
   providing a plurality of drive controllers to control said multi-axis positioners;

providing a calibration for each said multi-axis positioner stored in said drive controllers, wherein each said calibration is a measure of the variance of each said positioner from an ideal positioner for said work cell;

providing a system controller in communication with said drive controllers;

transferring said calibrations to said system controller;

generating position commands for said drive controllers from said system controller; and compensating for movement of said multi-axis positioners with reference to said ideal positioner with said calibrations.

28. The method of claim 27 further comprising the step of determining the static and dynamic characteristics of each said multi-axis positioner to generate said calibrations.

29. The method of claim 27 further comprising the steps of:

replacing a faulty multi-axis positioner with a new multi-axis positioner transferring said calibration of said new multi-axis positioner to said system controller; and compensating for the physical variances between said faulty multi-axis positioner and said new multi-axis positioner.

* * * * *